United States Patent
X et al.

(10) Patent No.: US 10,410,403 B1
(45) Date of Patent: Sep. 10, 2019

(54) THREE-DIMENSIONAL VOXEL MAPPING

(71) Applicant: Verizon Patent and Licensing Inc., Basking Ridge, NJ (US)

(72) Inventors: X, Portland, OR (US); Dana Maher, Portland, OR (US); Matthew S. Fanelli, Washington, DC (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/912,063

(22) Filed: Mar. 5, 2018

(51) Int. Cl.
*G06T 15/08* (2011.01)
*G06T 17/05* (2011.01)

(52) U.S. Cl.
CPC .............. *G06T 15/08* (2013.01); *G06T 17/05* (2013.01); *G06T 2200/04* (2013.01)

(58) Field of Classification Search
CPC ...................................................... G06T 17/05
See application file for complete search history.

(56) References Cited

U.S. PATENT DOCUMENTS

| | | | |
|---|---|---|---|
| 9,024,948 B2 * | 5/2015 | Wu | G06T 17/00 345/419 |
| 9,965,962 B1 | 5/2018 | X et al. | |
| 2009/0231327 A1 * | 9/2009 | Minear | G06T 11/001 345/419 |
| 2011/0202510 A1 * | 8/2011 | Salemann | G06F 17/30241 707/693 |
| 2014/0368504 A1 * | 12/2014 | Chen | G06T 17/005 345/424 |
| 2015/0269775 A1 * | 9/2015 | Thompson | G06T 5/30 345/420 |
| 2015/0371110 A1 * | 12/2015 | Hwang | G06K 9/6211 382/201 |
| 2016/0070984 A1 * | 3/2016 | Watts | G06T 17/05 382/201 |
| 2017/0200309 A1 * | 7/2017 | Qian | G06T 15/04 |
| 2017/0299397 A1 * | 10/2017 | Ichikawa | B60R 11/04 |
| 2018/0216954 A1 * | 8/2018 | Kitagawa | G01C 21/3635 |

* cited by examiner

*Primary Examiner* — Daniel F Hajnik

(57) ABSTRACT

A device can be configured to receive map data from at least one map data provider, the map data including data points representing information regarding a space. The device can generate a first set of voxels based on the map data, the first set of voxels representing a first three-dimensional space that includes: at least a portion of the space represented by the map data, and voxel data corresponding to at least one of the data points. The device may also index the first set of voxels in a first index; generate a second set of voxels based on the first set of voxels, the second set of voxels representing a second three-dimensional space that is included in the first three-dimensional space; and index the second set of voxels in a second index.

20 Claims, 6 Drawing Sheets

THREE-DIMENSIONAL VOXEL MAPPING

BACKGROUND

Map data can represent particular locations, and information associated with the particular locations, in two-dimensional or three-dimensional space. Map data can be used to create maps for a variety of things, including objects and/or geographical areas, and map data can come from a variety of sources, including two and three-dimensional images, point detection devices, vector mapping services, and/or the like. For example, satellite-based map data can be used to map traditional geographical locations, light detection and ranging (LIDAR) map data can be used to map three-dimensional objects and/or structures, map data derived from magnetic resonance imaging (MM) data can be used to map three-dimensional objects, map data derived from an X-ray scan can be used to map objects in two dimensions, and/or the like.

DETAILED DESCRIPTION OF PREFERRED EMBODIMENTS

Figure 1A:
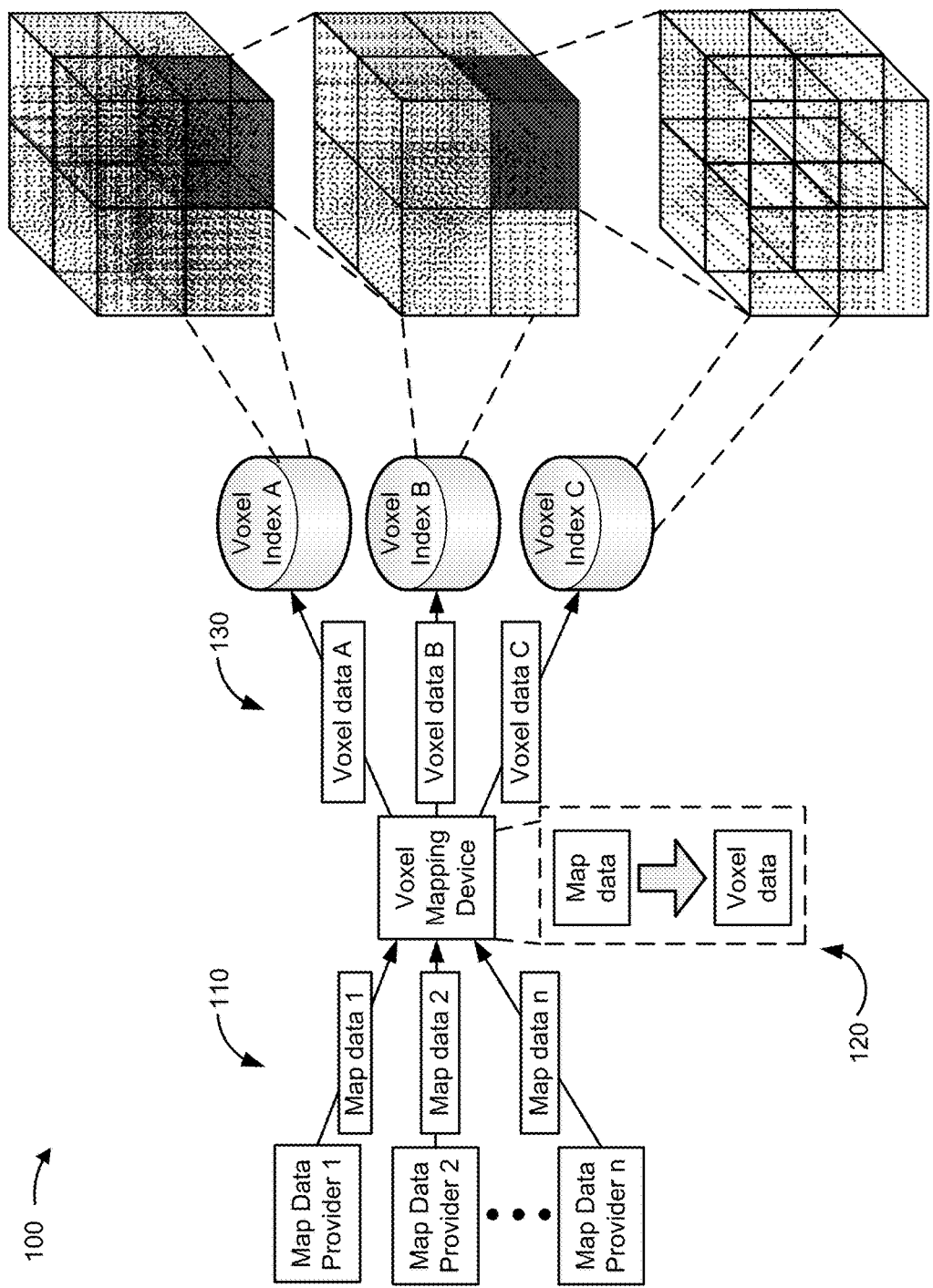
FIGS. 1A and 1B are diagrams of overviews of example implementations described herein.

The following detailed description of example implementations refers to the accompanying drawings. The same reference numbers in different drawings can identify the same or similar elements.

Map data can be used for a variety of purposes, some of which might involve storing a significant amount of data. For example, geographic maps can include map data regarding terrain, borders, location names (e.g., country, state, city, road, etc.), environment information (e.g., weather data, temperature measurements, air quality, etc.), traffic data, nearby structures, ownership, image(s), regulations (e.g., laws applicable to an area), and/or the like. Other types of maps and/or map data (e.g., maps related to medical scans, architectural plans, article manufacturing designs, and/or the like) can also include a variety of information. Three-dimensional (3D) maps can include a large volume of data to represent a variety of information, which can increase storage resource consumption, computational resource usage, transmission throughput requirements, and/or the like, for devices that might make use of 3D maps, such as devices used by aircraft operators for navigating 3D space, medical professionals analyzing 3D objects, and/or the like.

Some implementations, described herein, provide a voxel mapping device that is capable of generating and indexing voxels that are based on map data (e.g., voxels that store map data). The voxel mapping device can associate a variety of map data with a voxel, which represents a value in 3D space. The voxel mapping device can generate voxels at a variety of resolutions, or scales, and index the voxels at multiple resolutions. Generating multiple indices with different voxel resolutions can enable a device to store and/or make use of 3D map data at a resolution appropriate to a given context. For example, a large commercial aircraft flying at a high speed might make use of relatively large scale airspace voxels (e.g., 10 kilometer by 10 kilometer by 10 kilometer voxels storing data related to airspace) while a small unmanned aerial vehicle (UAV) moving slowly might make use of relatively small scale airspace voxels (e.g., 5 meter by 5 meter by 5 meter voxels storing data related to airspace). Using voxel maps at an appropriate resolution can enable devices to conserve resources, such as storage, processing, and data transmission resources, which can also affect energy consumption of devices (e.g., battery life).

In some implementations, the voxel mapping device can identify patterns and/or shapes within a voxel that are capable of being represented by an identifier (e.g., an equation, label, or the like). The ability to represent patterns and/or shapes by an identifier, rather than using multiple pieces of map data, can further enable a device that uses voxel maps to conserve resources. A reduction in resource usage for devices that make use of map data can increase the efficiency of, and reduce the cost of, using 3D map data in a variety of contexts.

FIG. 1A is a diagram of an overview of an example implementation 100 described herein. As shown in FIG. 1A, example implementation 100 includes map data providers (e.g., a computer, a mobile device, a peripheral device, etc.) that can provide a variety of map data for an area or an object. As further shown in FIG. 1A, example implementation 100 further includes a voxel mapping device that can receive map data from map data providers and generate and index voxel data using the received map data. As further shown in FIG. 1A, example implementation 100 further includes voxel indices (e.g., voxel index A, B, and C), such as one or more databases that can be included in a local or remote storage device.

As shown in FIG. 1A, and by reference number 110, one or more map data providers can provide map data to the voxel mapping device. In some implementations, the map data can include vector data (e.g., a vector map, such as a vector map provided by a geographic information system (GIS)). The map data may include data points specifying a 3D space for which voxels are to be generated and indexed (e.g., map data may indicate that voxels should be generated and indexed for airspace above sea level up to a particular altitude). Additionally, or alternatively, the map data can include a variety of data regarding the area specified by the map data, such as terrain information, topographical information, street information, border information, space restriction information, material information, object information, and/or the like. For example, a GIS can provide 3D geographic coordinates and information regarding the location specified by the coordinates, such as topographical terrain data, building addresses, and street names. As another example, a government regulator might provide map data that defines coordinates of restricted airspace. As yet another example, a LIDAR device might provide map data that defines objects in a 3D space using points, vectors, lines, and/or the like. In some implementations, the map data may be normalized (e.g., data points or other information included in the map data converted to a particular format) by the map data provider(s) prior to the map data being provided to the voxel mapping device. In some implementations, the voxel mapping device may parse the map data and normalize it in a manner designed to enable the map data to be used by the voxel mapping device.

As further shown in FIG. 1A, and by reference number 120, the voxel mapping device generates voxel data from the map data. For example, the voxel data can include a 3D grid of voxels for a 3D space, and each voxel can represent a portion of the 3D space in the 3D grid. While depicted as being cube-shaped voxels, voxels may include any polyhedron capable of being stacked to fill a 3D space (e.g., a cube, rhombic dodecahedron, or other plesiohedron). In some implementations, voxels can be associated with a location (e.g., (x, y, z) coordinates) in the 3D grid, and each voxel in the voxel grid can have a size, or volume (e.g., a 1 meter by 1 meter by 1 meter voxel, a 10 kilometer by 10 kilometer by 10 kilometer voxel, etc.). The voxel mapping device includes, in each voxel, the map data that is associated with a location that corresponds to the voxel location. In some implementations, the voxel data may be represented, for example, using vector tiles to store the map data.

By way of example, the voxel mapping device can generate a voxel grid for a city using map data provided by various map data providers. In this case, the voxel mapping device might use 100 meter by 100 meter by 100 meter voxels, and the voxels can include the data provided by the map data providers. For example, a voxel that includes a portion of the city might include multiple 3D points associated with one or more street names, street addresses, building descriptions, temperature measurements, zoning information, regulatory information, and/or the like. Additionally, or alternatively, the voxels can include a timestamp for the map data (e.g., when the temperature was measured, when the zone was last identified, and/or the like). In some implementations, the voxel mapping device can generate voxel data at multiple resolutions, or scales. For example, the example voxel grid of 100 meter×100 meter×100 meter voxels for the city can be sub-divided into a voxel grid of 10 meter×10 meter×10 meter voxels, which can further be subdivided into a voxel grid of 1 meter×1 meter×1 meter voxels. In some implementations, the foregoing voxel data representation may be implemented, for example, in a vector tiling pyramid while using a particular spatial curve for indexing.

As further shown in FIG. 1A, and by reference number 130, the voxel mapping device indexes multiple different types of voxel data into multiple indices. While the example implementation 100 depicts three indices and three sets of voxel data, one or more indices can be used. The indices may use the same indexing approach (e.g., special curve indexing), which can be applied at different voxel sizes, or scales. In the example implementation 100, the sets of voxel data all represent the same area, but each set of voxel data can represent the area in a different manner (e.g., by changing the resolution of or the map data included in each set of voxel data). For example, voxel data can include the same data but at different resolutions. In this situation, voxel data A might include 10 kilometer by 10 kilometer by 10 kilometer voxels, voxel data B might include 1 kilometer by 1 kilometer by 1 kilometer voxels, and voxel data C might include 100 meter by 100 meter by 100 meter voxels. Additionally, or alternatively, different sets of voxel data can include different map data. For example, one set of voxel data might include topography map data, while another set of voxel data does not.

In some implementations, the voxel mapping device may index voxel data using space filling curves for three dimensions. This may enable, for example, cube-shaped voxels and/or other geometries (e.g., other tessellated three-dimensional geometries that may be used to represent voxels in shapes other than cubes), by storing indexes of adjacent voxels, and by various computational geometry methods for determining which addresses are relevant to which areas. In some implementations, this voxel data may be indexed in four or five dimensions (e.g. x, y, z, time, and possibly velocity depending on the map data). In some implementations, using a space-filling curve, such as a Hilbert space-filling curve, Gray curve, Peano curve, and/or the like for storing voxel data may function as both an indexing system and data container, or may function as searchable indices matched to a separate storage structure (e.g., a matrix, array, and/or the like). In situations where vehicles are routed using the voxel data, voxels may be used as containers for some number of aircraft, and local deconfliction may occur as aircraft request to pass between voxels.

Figure 1B:
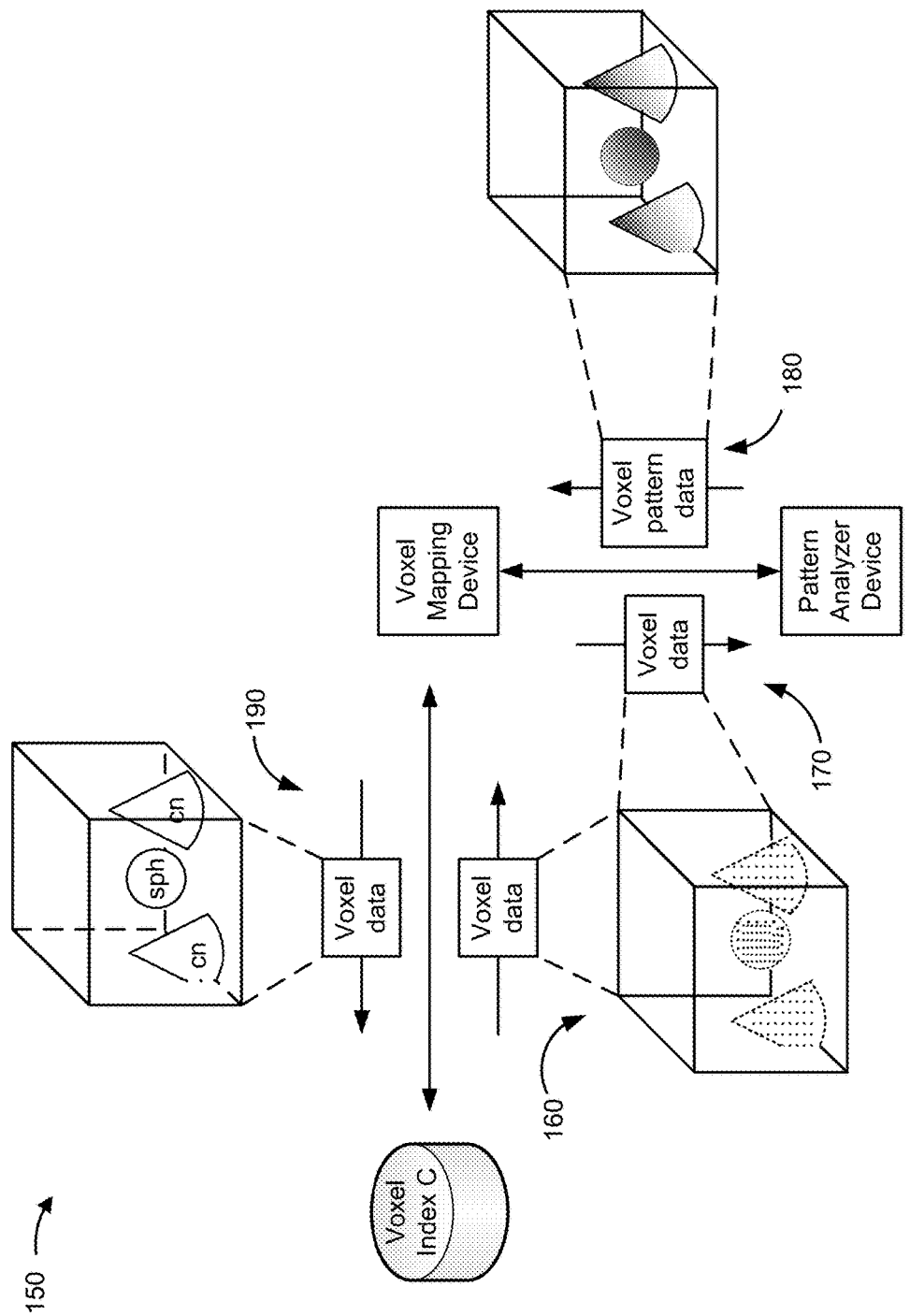

FIG. 1B is a diagram of an overview of an example implementation 150 described herein. As shown in FIG. 1B, example implementation 150 includes voxel index C (which can be, for example, the same voxel index C shown in implementation 100), which can include map data for one or more voxels (e.g., 100 meter by 100 meter by 100 meter voxels). In example implementation 150, the voxel mapping device (which can be, for example, the same as the voxel mapping device shown in implementation 100) can replace a portion of the map data included in a voxel with data representing the map data. For example, in a situation where points of map data are in the shape of a sphere, the points can be represented by data indicating a sphere, rather than every point of the sphere (e.g., a sphere may be represented by data indicating the center point and radius of the sphere). The voxel mapping device can, in some implementations, use a pattern analyzer device (e.g., a server computer or other type of computing device designed to perform pattern and/or shape recognition) to analyze map data included in one or more voxels to identify patterns and/or shapes indicated by the placement of points of map data; using the results of pattern analysis, the voxel mapping device may generate a representation of the patterns and/or shapes (e.g., a formula to represent the size and position of a sphere), which may be more efficiently stored, transmitted, processed, and/or the like.

As shown in FIG. 1B, and by reference number 160, the voxel mapping device obtains voxel data from voxel index C. In example implementation 150, the voxel data includes map data for one voxel, as indicated by points within the 3D space. These points can represent a variety of information about a 3D space, such as light detection and ranging (LIDAR) points provided by a LIDAR device, terrain data provided by a GIS device, or boundary data provided by a government organization. As shown by reference number 170, the voxel mapping device provides the voxel data to a pattern analyzer device that is capable of analyzing map data included in one or more voxels to identify one or more shapes, patterns, and/or the like, in the voxel(s).

As further shown in FIG. 1B, and by reference number 180, the voxel mapping device obtains voxel shape data from the pattern analyzer device. The voxel shape data can include, for example, data identifying one or more shapes that were identified in the one or more voxels. In example implementation 150, the pattern analyzer device has identified two cones and a sphere in the example voxel. As shown by reference number 190, the voxel mapping device indexes updated voxel data for the voxel in which the shapes were identified. For example, the voxel mapping device can replace the original map data of the voxel with data representing the map data (e.g., in a manner designed to replace the original map data with data that does not consume as many computing resources to store, process, and/or transmit).

By way of example, the voxel mapping device can store, in voxel index C, data representing two cones and a sphere for the example voxel. Data representing a cone or sphere can take a variety of forms, including a shorthand reference, an equation, data defining dimensions and particular portions of the shape (e.g., the top, bottom center, and radius of the base for the cone), and/or the like. In some implementations, when a shape is included in multiple voxels, data representing the shape can be included in each of the voxels along with data representing one or more points where the shape and edge of the voxels intersect (e.g., as depicted in the example implementation 150 by dots where one of the cones intersects with the edge of the example voxel).

By implementing a voxel mapping device in a manner similar to that depicted in example implementations 100 and 150, using voxel maps at an appropriate resolution can enable devices to conserve resources, such as storage, processing, and data transmission resources, which can also affect energy consumption (e.g., battery life). For example, the ability to store, process, transmit, and/or receive only a portion of a shape and/or other map data associated with a voxel may enable devices to conserve resources by only storing, processing, transmitting, and/or receiving relevant map data. In addition, the ability to represent shapes by an identifier (e.g., a formula to recreate a sphere, circle, triangle, or other shape), rather than using multiple pieces of map data (e.g., multiple points of data that define a sphere, circle, triangle, or other shape), can further enable a device that uses voxel maps to conserve resources. For example, storing, processing, and/or transmitting a formula for a sphere may be more efficient than storing, processing, and/or transmitting thousands of data points that might otherwise be used to define the sphere). A reduction in resource usage for devices that make use of map data can increase the efficiency of, and reduce the cost of, using 3D map data in a variety of contexts. A reduction in resource usage can also enable voxel map data to be used by devices that might not have otherwise been capable of handling the voxel map data, enabling the use of voxel map data in additional contexts.

As indicated above, FIGS. 1A and 1B are provided merely as examples. Other examples are possible and can differ from what was described with regard to FIGS. 1A and 1B. For example, there can be additional devices and/or networks, fewer devices and/or networks, different devices and/or networks, or differently arranged devices and/or networks than those shown in FIGS. 1A and 1B. Furthermore, two or more devices shown in FIGS. 1A and 1B can be implemented within a single device, or a single device shown in FIG. 1 can be implemented as multiple, distributed devices. By way of example, the voxel mapping device, while depicted in FIGS. 1A and 1B as a single device, may be implemented in multiple devices (e.g., using distributed computing devices, a cloud computing platform, and/or the like); multiple voxel mapping devices may be used, for example, to separately manage voxel data for different portions of space, where each voxel mapping device is responsible for handling voxel data for a corresponding space (e.g., space which may include multiple voxels, be included in a single voxel, or include multiple portions of multiple voxels). Additionally, or alternatively, a set of devices (e.g., one or more devices) of implementations 100 and/or 150 can perform one or more functions described as being performed by another set of devices of implementations 100 and/or 150.

Figure 2:
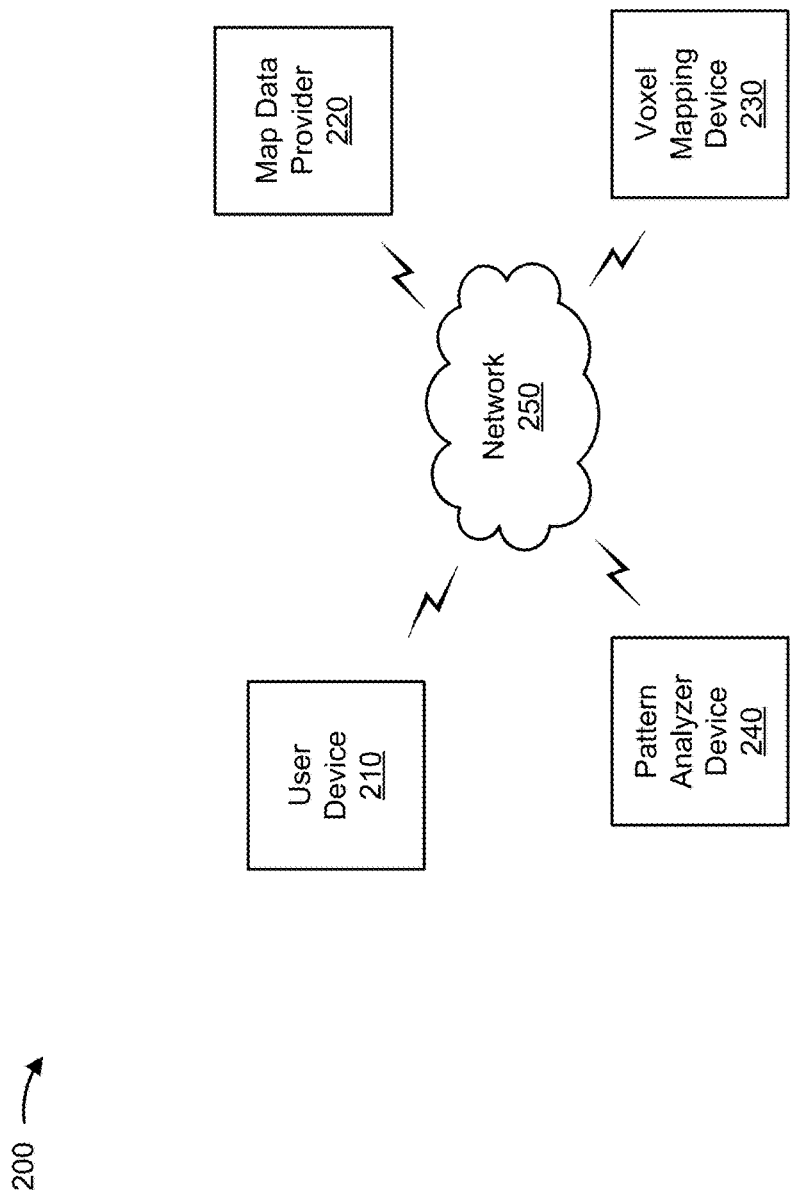
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a user device 210, a map data provider 220, a voxel mapping device 230, a pattern analyzer device 240, and a network 250. Devices of environment 200 can interconnect via wired connections, wireless connections, or a combination of wired and wireless connections.

User device 210 includes one or more devices capable of receiving, generating, storing, processing, and/or providing information associated with 3D voxels. For example, user device 210 can include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. The user device can be included in and/or attached to a variety of other types of devices that might make use of 3D voxels. Examples include aircraft (including manned and unmanned aircraft) computing devices, such as a flight controller and/or navigation component; ground-based vehicle (including autonomous vehicles or user-operated vehicles) computing devices, such as a collision avoidance system and/or navigation component; and/or medical devices, such as medical scanning and/or analytic devices.

Map data provider 220 includes one or more devices capable of receiving, generating, storing, processing, and/or providing information associated with map data. For example, map data provider 220 can include a communication and/or computing device, such as a mobile phone, laptop computer, tablet computer, handheld computer, gaming device, wearable communication device, server device, peripheral device, or a similar type of device. An example map data provider 220 can include a GIS server device, a LIDAR device, an X-Ray device, a navigation device, a magnetic resonance imaging (MM) device, or another device that is capable of providing data that represents information about a space in two or three dimensions. In some implementations, map data provider 220 can include a user device 210 (e.g., an aircraft can be both a user of map data and/or a provider of map data).

Voxel mapping device 230 includes one or more devices capable of receiving, generating, storing, processing, and/or providing information associated with voxels, which represent values in 3D space. For example, voxel mapping device 230 can include a communication and/or computing device, such as a server device, mobile phone, laptop computer, tablet computer, handheld computer, gaming device, wearable communication device, or a similar type of device. An example voxel mapping device 230 can include a server computer that generates 3D voxels based on map data received from a map data provider 220 and provides the 3D voxels to one or more user device(s) 210 for a variety of purposes (e.g., for use in navigation, analytics, collision avoidance, and/or the like).

In some implementations, voxel mapping device 230 can be implemented by one or more virtual machines operating in a cloud computing environment. In some implementations, voxel mapping device 230 can include a user device 210 (e.g., a computer can be both a user of map data and/or a device capable of performing 3D voxel mapping). Additionally, or alternatively, voxel mapping device 230 may include multiple devices, each responsible for generating, storing, processing, and/or providing information associated with voxels for separate physical spaces. For example, voxel data for one portion of a relatively large space, such as a portion of a large voxel, may be managed by one voxel mapping device 230, while another portion of the relatively large space, such as another portion of the large voxel, may be managed by another voxel mapping device 230.

Pattern analyzer device 240 includes one or more devices capable of receiving, storing processing, and/or providing information associated with pattern and/or shape recognition. For example, pattern analyzer device 240 can include a communication and/or computing device, such as a server device, mobile phone, laptop computer, tablet computer, handheld computer, gaming device, wearable communication device, or a similar type of device. A pattern analyzer device 240 might utilized supervised and/or unsupervised machine learning techniques to recognize patterns, shapes, and/or irregularities in map data. An example pattern analyzer device 240 can include an optical character recognition device, facial recognition device, image recognition device, computer aided diagnosis (CAD) device, and/or the like.

Network 250 includes one or more wired and/or wireless networks. For example, network 250 can include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and the network shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
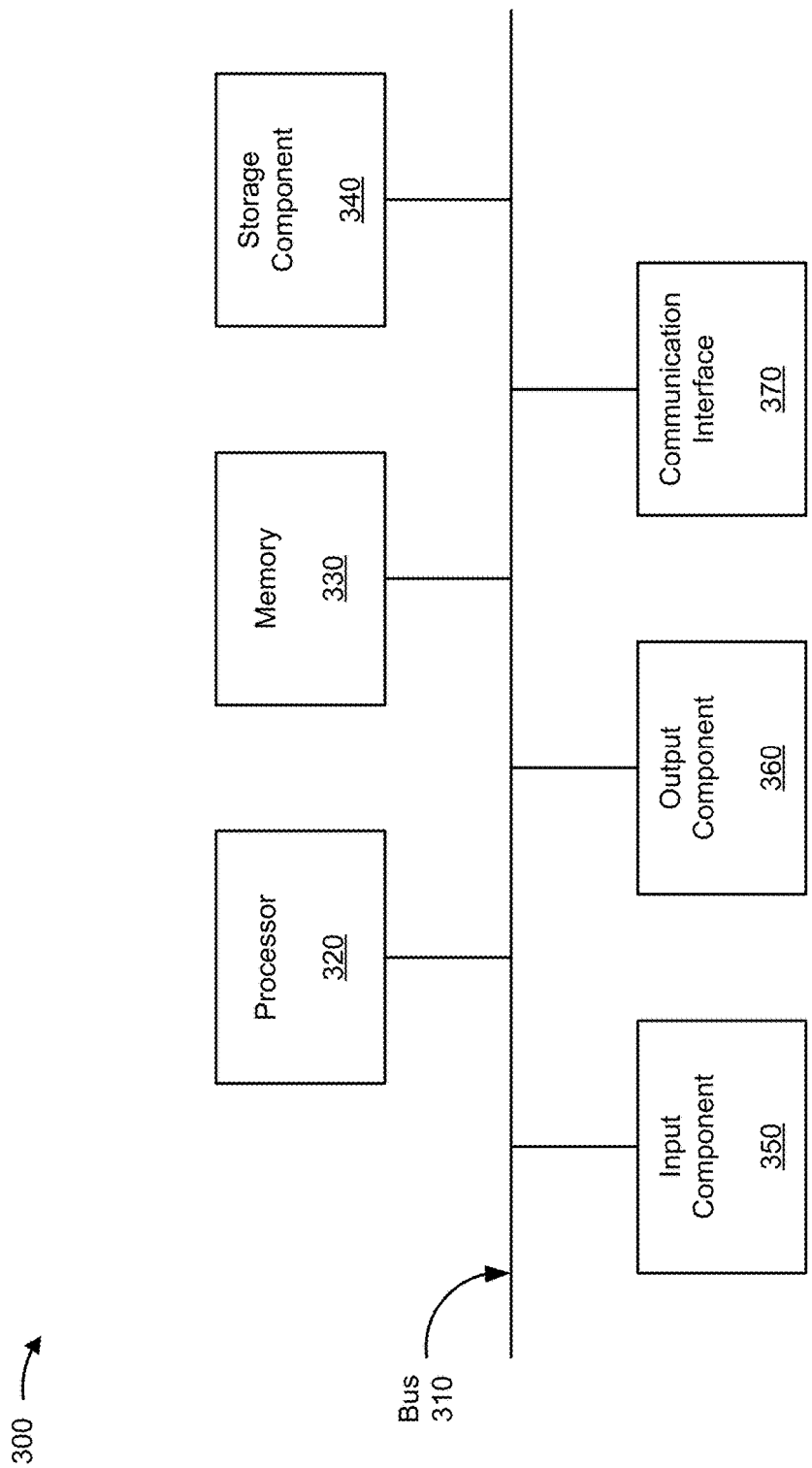
FIG. 3 is a diagram of example components of one or more devices of FIG. 2.

FIG. 3 is a diagram of example components of a device 300. Device 300 can correspond to user device 210, map data provider 220, voxel mapping device 230, and/or pattern analyzer device 240. In some implementations, user device 210, map data provider 220, voxel mapping device 230, and/or pattern analyzer device 240 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
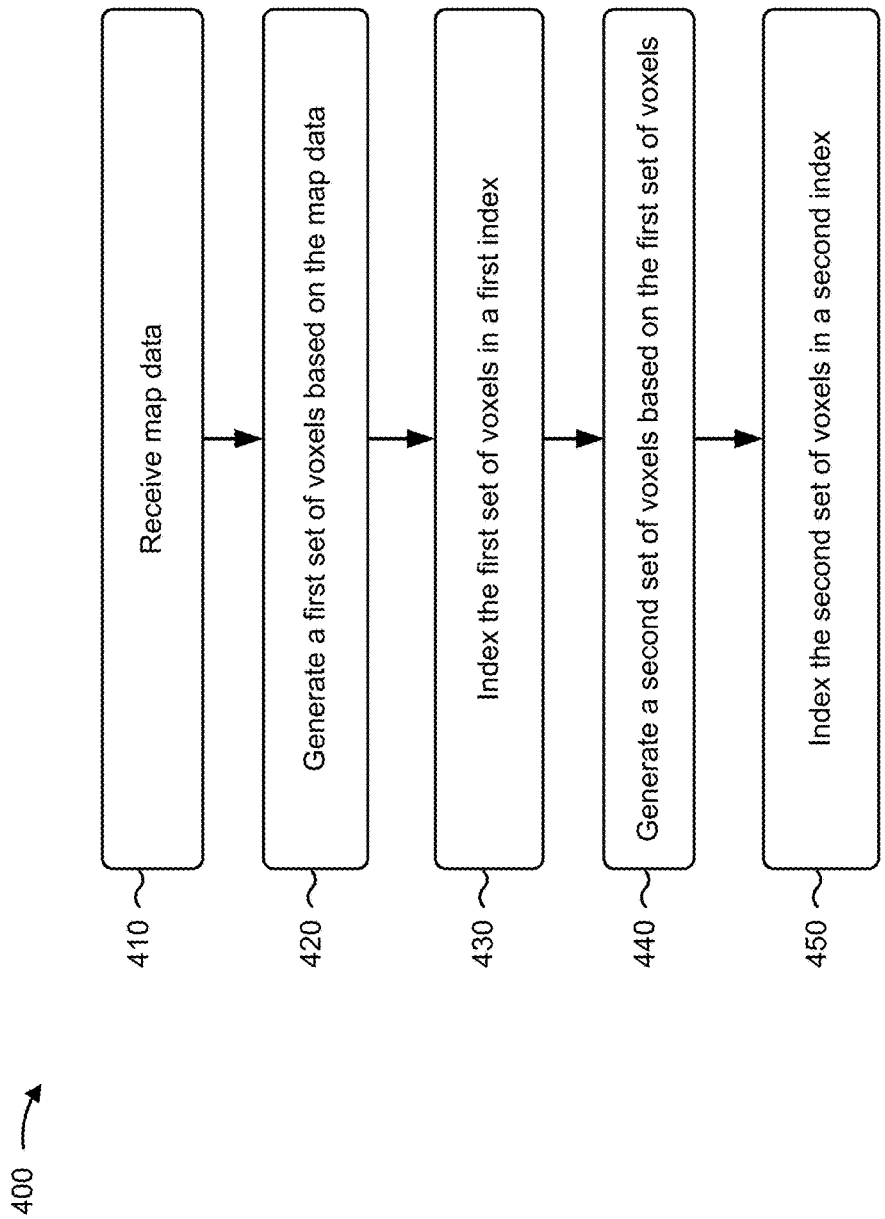
FIG. 4 is a flow chart of an example process for three-dimensional voxel mapping.

FIG. 4 is a flow chart of an example process 400 for three-dimensional voxel mapping. In some implementations, one or more process blocks of FIG. 4 can be performed by voxel mapping device 230. In some implementations, one or more process blocks of FIG. 4 can be performed by another device or a group of devices separate from or including voxel mapping device 230, such as user device 210, map data provider 220, and/or pattern analyzer device 240.

As shown in FIG. 4, process 400 can include receiving map data (block 410). For example, voxel mapping device 230 can receive map data from one or more map data providers 220, user input, a configuration file, and/or the like. The map data can be for a particular 3D space, including map data for a geographical space, an object, or anything else that can be represented in a 3D space. The map data can specify a variety of features of the 3D space, such as the location and nature of terrain, objects, and/or the like. A piece, or point, of map data can have a corresponding location and, in some implementations, information about that corresponding location.

In some implementations, the map data includes vector data, such as map data provided by a GIS. In some implementations, vector data can identify position (e.g., (x, y, z) coordinates or latitude, longitude, and altitude) of a point of map data. Additionally, or alternatively, vector data can specify features associated with the corresponding positions, such as composition of terrain (e.g., rock, dirt, water, road, etc.), composition of objects (e.g., polymer, metal, organic, etc.), size of objects (e.g., height of a line representing a building) or other features (municipal zoning status, restrictions of property, government borders, etc.).

In some implementations, other types of map data can be received by voxel mapping device 230. For example, map data can include MRI image data or functional magnetic resonance imaging (fMRI) image data, LIDAR point detection data (e.g., a 3D field of points detected by a LIDAR device), or optical character recognition data. As yet another example, map data can include computer graphic data (e.g., 3D points and graphic information, such as color, texture, and/or the like). Map data may be received in a variety of formats, and, in some implementations, may be normalized (e.g., converted into a format voxel mapping device may use, such as vector data) by map data providers 220 before it is provided to voxel mapping device 230. In some implementations, voxel mapping device 230 may normalize the map data received from map data providers 220 (e.g., by converting the map data from the format in which the map data was received to a format that map data provider 220 uses, such as vector data).

In some implementations, map data may define the 3D space for which voxel mapping device 230 will generate and index voxels. For example, rather than (or in addition to) including information related to features included in a 3D space, the map data may define the 3D space (e.g., the size and/or location of the three dimensional space). By receiving map data that defines the 3D space (e.g., via user input, a configuration file, map data providers 220, and/or the like), voxel mapping device 230 can be provided with information enabling voxel mapping device 230 to generate and index a set of voxels for the 3D space (e.g., empty voxels and/or voxels that include other map data).

In this way, voxel mapping device 230 can receive map data from one or more map data providers 220, enabling voxel mapping device 230 to generate voxels using the map data.

As further shown in FIG. 4, process 400 can include generating a first set of voxels based on the map data (block 420). For example, voxel mapping device 230 can generate a first set of voxels that each defines a portion of 3D space and can include at least a portion of the received map data. In some implementations, voxel mapping device 230 can generate the first set of voxels based on receipt of the map data, receipt of user input, receipt of a third party request, the occurrence of a triggering event, and/or the like. In some implementations, voxel mapping device 230 can generate the first set of voxels in a manner designed to represent at least a portion of the provided map data in a regular grid of 3D voxels that each represents a portion of 3D space. For example, voxel mapping device 230 can, based on received map data, generate a first set of voxels designed to represent the structures and terrain for a portion of a city.

In some implementations, voxel mapping device 230 may generate the first set of voxels prior to receiving map data or based on map data that defines the 3D space that the voxels are to represent. In this situation, the generation of voxels may be based on an expected receipt of map data (or additional map data). For example, prior to receiving map data, voxel mapping device 230 may generate (and, as described in further detail below, index) empty voxels that are designed to be used to store map data. The size, shape, and arrangement of the voxels may be predetermined and/or based on user input. In this situation, generating (and, in some implementations, indexing) voxels prior to receiving the map data can enable voxel mapping device 230 to quickly populate existing voxels with map data as it is received. Similarly, in a situation where voxel mapping device 230 receives map data that only defines the 3D space (and does not include additional map data to be stored in voxels), voxel mapping device 230 may use the map data to generate empty voxels.

In some implementations, the shape of the voxels can vary (e.g., hexahedron, pyramid, and/or other plesiohedra), and in some implementations the voxels can be uniform shapes, such as 3D cubes that are all the same size. The volume of space represented by the voxel can, in some implementations, vary based on the position (e.g., coordinates) associated with the voxel. For example, the curvature of the Earth might cause some sets of voxels, in some implementations, to include voxels of varying sizes (e.g., 3D hexahedron-shaped voxels representing airspace above Earth might be larger at higher altitudes than lower altitudes). To illustrate, as altitude increases, the size of the voxels can increase, e.g., in a manner designed to keep voxels aligned, such that a ray extending vertically (relative to the surface of the Earth) would pass through the same relative portions of vertically stacked voxels. The foregoing voxel arrangement can simplify the use of a three dimensional coordinate system for voxels, where the vertical axis can be represented by straight rays extending perpendicular to the Earth's surface, and horizontal axes can be represented by rays that follow the curvature of the Earth.

In situations where aircraft flying at a higher altitude are more likely to be traveling faster than those at a lower altitude, sizing and arranging voxels such that voxels are larger at higher altitudes than lower altitudes can simplify various operations, such as deconfliction (aircraft collision avoidance), by reducing the number of voxels to be retrieved, processed, and/or the like at higher altitudes (where faster flying aircraft might, in another voxel arrangement, be quickly traversing many smaller voxels, which may complicate deconfliction operations). In some implementations, the volume of space represented by voxels may remain the same, and voxels may be more numerous at higher altitudes (e.g., based on the curvature of the Earth or other shape being mapped).

In some implementations, the amount of 3D space represented by a voxel can be based on a variety of things. For example, the amount of space can be based on the size of the space represented by the map data (e.g., size of the voxels might increase as the size of the space represented by the map data increases). In some implementations, the amount of 3D space can be based on context (e.g., a 3D map of a city might be more likely to include voxels that represent a relatively large area than a map of a small object, like a medical 3D map of a brain). By way of example, a large geographic area might be represented by 10 kilometer by 10 kilometer by 10 kilometer voxels, and a small geographic area might be represented by 100 meter by 100 meter by 100 meter voxels. As another example, an object, such as a map of a brain based on MM data, might have 1 centimeter by 1 centimeter by 1 centimeter voxels.

In some implementations, the amount of 3D space represented by a voxel can be based on the context in which the voxels are intended to be used. For example, a voxel map designed to be used for navigating large commercial aircraft might include voxels representing a larger amount of space than voxels designed to be used for navigating small unmanned aerial vehicles. As another example, a voxel map designed to be used by a patient-facing medical device might include voxels representing a larger amount of space than voxels designed to be used by a microscopic medical analytic device.

In some implementations, the number of voxels in the first set can vary. For example, all of the map data received for a space could fit in a single voxel. In some implementations, voxel mapping device 230 can generate voxels based on density of the map data and an amount of map data to be included in each voxel. For example, voxel mapping device 230 might generate voxels in a manner designed to ensure that voxel density does not exceed a threshold density (e.g., density in terms of the number of points and/or vectors, and/or density in terms of storage space required to store the map data).

In some implementations, voxel mapping device 230 can include a variety of types of data in a voxel. For example, voxels can include 3D points and data associated with each 3D point. In some implementations, the data can be based on the map data received by voxel mapping device 230. By way of example, voxel mapping device 230 can include, in a voxel for a geographic location, points representing roads, bodies of water, boundaries of municipalities, municipal zoning sections, buildings, terrain, and/or the like. Points representing the foregoing can be associated with data identifying that which is represented by the points. For example, a 3D point for a road can be associated with coordinates and data indicating the name of the road; a 3D point for the boundary of government restricted airspace (e.g., around an airport) can be associated with coordinates and data identifying the point as part of a restricted airspace boundary; a 3D point for a medical image of a brain can be associated with data identifying an anomaly at that point, and/or the like.

In some implementations, voxel mapping device 230 can replace at least a portion of the map data included in the first set of voxels with data representing the map data. For example, multiple points of map data can be represented by an identifier, equation, and/or the like. In this situation, the representative data (the identifier, equation, etc.) is designed to require less computing resources than the map data that the representative data represents. For example, map data might indicate a hemisphere using multiple points of map data, and voxel mapping device 230 can represent the hemisphere in a voxel using an equation, rather than storing the points of map data (e.g., in a manner designed to reduce the amount of data included in the voxel).

In some implementations, voxel mapping device 230 can provide voxel data (e.g., one or more voxels) to pattern analyzer device 240. Pattern analyzer device 240 can provide voxel mapping device 230 with voxel pattern data that indicates patterns (including shapes, repeated portions of map data, and/or the like) identified in the voxel data. Voxel mapping device 230 can use the voxel pattern data to create representative data to represent one or more of the patterns identified in the voxel data.

By way of example, 1000 points of map data in a voxel might be associated with a no-fly zone and might define a hemisphere shape (e.g., as identified and indicated by pattern analyzer device 240). In this example, voxel mapping device 230 can remove the 1000 points of map data that are associated with the no-fly zone and replace them in the voxel with representative data, such as an identifier or equation for a hemisphere, and particular features of the hemisphere, such as the location of the center, location of the top, and radius of the hemisphere.

In some implementations, a pattern can span multiple voxels. For example, map data points for a building might be represented by a rectangular cuboid that is intersected by the border between two voxels. In this situation, the representative data (e.g., the data representing the building in the voxel) can include additional pattern reference data identifying one or more intersecting points where the pattern and voxel border meet (e.g., in a manner designed to enable a device that draws the 3D voxel data to properly draw the portions of the pattern together). For example, a UAV that uses a 3D voxel map for flight navigation can use the voxel data to navigate around a building, and when transitioning from one voxel to another, the UAV can use the representative data (including the intersecting points) in a manner designed to ensure that the UAV identifies the building in the proper location.

As noted in the examples above, the representative data that replaces points of map data in a voxel can be designed to be used by a computing device that makes use of the voxels (e.g., a computing device used by a UAV for navigating, an autonomous vehicle for collision avoidance, or a 3D printer for printing an object). In this way, representative data can take up less storage space, use less processing power to process, and consume less bandwidth to transfer, which can enable devices that don't have the resources to use full map data (or to conserve resources for devices that could handle the full map data) to make use of voxel data that includes representative data, instead of the full map data.

In this way, voxel mapping device 230 can generate a first set of voxels based on the map data, enabling voxel mapping device 230 to provide voxel data that can be used by various devices to view 3D data based on the map data. For example, an aircraft might use 3D voxel data representing a geographic area to navigate around mountains and tall buildings, avoid restricted airspace, and/or the like. In addition, generating voxel data can enable voxel mapping device 230 to index the voxel data in a manner designed to facilitate use of voxel data by other computing devices.

As further shown in FIG. 4, process 400 can include indexing the first set of voxels in a first index (block 430). For example, voxel mapping device 230 can store the first set of voxels in a data storage device using an index. In some implementations, the index in which the first set of voxels are stored can be stored in a local and/or remote storage device. In this way, storing the voxel data in an index can enable voxel mapping device 230 and other devices, such as user device 210, to selectively obtain voxel data from the index (e.g., by querying for voxels in a specific location, voxels including a particular type of data, and/or the like.).

In some implementations, voxel mapping device 230 can index voxels in a database, which can, for example, enable querying for specific types of voxels and retrieval of specific information. In a situation where voxel data is made available to user device 210, such as making geographic data available to flight controllers onboard aircraft, user device 210 can query for voxel data that identifies 3D map data within their current airspace, airspace along a flight path of the aircraft, and/or query for particular information, such as voxels including only building data above a certain altitude and/or voxels including only map data that identifies restricted airspace.

In some implementations, voxel mapping device 230 can use a variety of different types of indices to store voxel data (e.g., a lookup table, associative array, and/or the like). In some implementations, voxel mapping device 230 can index, for one or more of the voxels, pattern data. For example, in a situation where voxel mapping device 230 replaces points of map data with data representing a shape, voxel mapping device 230 can index the representative data (e.g., an identifier, equation, and/or the like). Indexing the representative data can enable, for example, user device 210 to reproduce the pattern or shape when retrieving the voxel that includes the representative data.

In some implementations, voxel mapping device 230 can index the first set of voxels prior to the receipt of map data, or prior to receipt of map data that is to be included in the voxels. For example, in preparation for the receipt of map data, voxel mapping device 230 may generate and index an empty set of voxels (e.g., based on a predetermined configuration, user input, and/or the like). The index may, in some implementations, be altered (e.g., re-indexed), such as in a situation where a different type of index, and/or multiple indices, is/are desired. Re-indexing may be performed using an existing index (e.g., an index described above) and/or by creating a new index of the desired type.

In this way, voxel mapping device 230 can store the first set of voxels in a data storage device using an index, enabling voxel mapping device 230 to make map data available to devices that make use of map data in three dimensions, such as user device 210.

As further shown in FIG. 4, process 400 can include generating a second set of voxels based on the first set of voxels (block 440). For example, voxel mapping device 230 can generate a second set of voxels based on the first set of voxels. In some implementations, the voxels of the second set can include the same map data as the voxels of the first set. In this situation, the second set of voxels can be different from the first set of voxels based on a size of the space represented by the individual voxels (e.g., each voxel in the first set might represent a 10 kilometer by 10 kilometer by 10 kilometer space, while each voxel in the second set might represent a 100 meter by 100 meter by 100 meter space). Additionally, or alternatively, the voxels of the second set can include map data that is different from the map data included in the voxels of the first set. For example, the second set of voxels can include a subset of the data that is included in the first set (e.g., the first set of voxels might include all map data for a particular 3D space while the second set of voxels might include a portion of the map data for the same 3D space).

In some implementations, voxel mapping device 230 can generate the second set of voxels by subdividing the first set of voxels. For example, in a situation where the first set of voxels includes 4 cube-shaped voxels, voxel mapping device can subdivide the 4 voxels (e.g., into a second set of 16 voxels, 4 for each voxel in the first set). Subdividing can be performed, for example, by generating new voxels of the target size or target ratio of the original voxels, and including, in the new voxels, the map data associated with the space included in the new voxels.

In some implementations, voxel mapping device 230 can subdivide a portion of the voxels included in the first set of voxels. For example, if a first set of voxels has 27 voxels in a 3×3×3 cube arrangement, voxel mapping device 230 can generate the second set of voxels by further subdividing each voxel of the bottom layer (i.e., the bottom 9 voxels of the first set) of the 3D space into 3×3×3 voxels, without subdividing or modifying the voxels of the top two layers. As a result, the second set of voxels would include 18 voxels (i.e., the top two layers of 3×3 cube-shaped voxels) representing relatively large spaces (e.g., the same size as the top 18 voxels of the first set) and 243 voxels for the bottom layer of the 3D space representing relatively small spaces (e.g., the original 9 voxels that made up the bottom layer of the first set can each be sub-divided into 27 cube-shaped voxels). In some implementations, subdividing a portion of the 3D space might be done based on map data density. In the example above, the bottom layer might be more dense (e.g., include more map data) than the middle and/or top layers.

In some implementations, voxel mapping device 230 generates the second set of voxels based on the manner in which the map data included in the voxels is to be used and/or the type of user device 210 that will make use of the voxels. For example, the first set of voxels can include data relevant to a first type of user device 210, while the second set of voxels can include map data relevant to a second type of user device 210. By way of example, the first set of voxels might include data relevant to an autonomous vehicle (e.g., street names, building identifiers, addresses, and/or the like), and the second set of voxels might include data relevant to an unmanned aerial vehicle, such as building location data for tall buildings, terrain data for mountains, airspace restriction data for private or public restrictions on airspace (e.g., indicating the extent of a no-fly zone near an airport), and/or the like. In this way, voxel mapping device 230 can generate separate sets of voxels for separate types of user devices 210.

In some implementations, voxel mapping device 230 can generate the second set of voxels in a manner designed to provide a set of voxels that can be stored and/or used in a relatively efficient manner (e.g., more efficient than the first set of voxels and/or the originally provided map data). For example, voxel mapping device 230 might sub-divide voxels based on a measure of density of the map data in each voxel and reduce the granularity, specificity, or density, of some or all of the map data. In some implementations, voxel mapping device can generate the second set of voxels based on an amount of storage resources used to store the voxel data (e.g., in a manner designed to enable the voxel data to be used by devices with relatively low storage, processing, or transmission capability).

As a specific example, representing a building might not require all of the map data points that might have been provided by a LIDAR device, but just a few points (e.g., the points associated with corners of a rectangular building). In this situation, the granularity of the map data included in the second set of voxels can be reduced (e.g., by including in the second set of voxels every other map data point, or one in every ten map data points), enabling the second set of voxels to be stored while consuming less storage resources than the first set, processed using less processing resources than the first set, and/or transmitted using less network bandwidth than the first set. Storing less dense map data can be beneficial, for example, in a situation where voxel map data is to be used by a UAV having limited processing and/or data transmitting capabilities, and the second set of voxels could be generated in a manner designed to enable the UAV to make use of the map data with its relatively limited resources. Additionally, storing less dense map data may also enable less complex visualization at larger scales; for example, a regional level voxel size may include less dense data to enable quick rendering, while voxels rendered on a neighborhood scale may include much more detail. Similar approaches may be used for deconfliction (e.g., collision avoidance); for example, less complex and/or large scale geometries may trigger thresholds at which the paths of one or more aircraft will be analyzed at a more granular or complex level to prevent a collision.

In this way, voxel mapping device 230 can generate a second set of voxels based on the first set of voxels, enabling voxel mapping device 230 to generate voxels that might be useful in different contexts and/or to different types of user devices 210.

As further shown in FIG. 4, process 400 can include indexing the second set of voxels in a second index (block 450). For example, voxel mapping device 230 can index the second set of voxels in a data storage device using an index. In some implementations, voxel mapping device 230 can index the second set of voxels in the same data storage device as the first set of voxels (described above with reference to block 430). In some implementations, the index in which the first set of voxels are stored can be stored in a local and/or remote storage device. In this way, storing the voxel data in an index can enable voxel mapping device 230 and other devices, such as user device 210, to selectively obtain voxel data from the index (e.g., by querying for voxels in a specific location, voxels including a particular type of data, and/or the like).

In some implementations, voxel mapping device 230 can index voxels in a database, which can, for example, enable querying for specific types of voxels and retrieval of specific information, as described above with reference to block 430. In some implementations, voxel mapping device 230 can use different types of indices to store voxel data (e.g., a lookup table, associative array, and/or the like), as also described above with reference to block 430. In some implementations, the voxel mapping device may index voxel data using space filling curves for three dimensions. This may enable, for example, cube-shaped voxels and/or other geometries (e.g., other tessellated three-dimensional geometries that may be used to represent voxels in shapes other than cubes), by storing indexes of adjacent voxels, and by various computational geometry methods for determining which addresses are relevant to which areas. In some implementations, this voxel data may be indexed in four or five dimensions (e.g. x, y, z, time, and possibly velocity depending on the map data). In some implementations, using a space-filling curve, such as a Hilbert space-filling curve, Gray curve, Peano curve, and/or the like for storing voxel data may function as both an indexing system and data container, or may function as searchable indices matched to a separate storage structure (e.g., a matrix, array, and/or the like). In situations where vehicles are routed using the voxel data, voxels may be used as containers for some number of aircraft, and local deconfliction may occur as aircraft request to pass between voxels.

Map data, such as traditional GIS data formats and some other existing geospatial datasets, is often index or stored by storing geometries as complex polygons, which represent all of the geometries' vertices. However, storing representations of geometries in a manner that includes all of the geometries' vertices may be inefficient for storing some shapes, including circles and circular arcs (i.e. partial circles), spheres, and/or the like, which often require approximation by a very large number of points. In addition, the Earth is approximately spherical, which makes the geometry of airspace mapping quite different from the Euclidean geometry of a plane. For example, the shortest path between two points on the plane is a straight line, whereas on the sphere it may be a great circle, which may appear as a curved path on planar map projections. Accordingly, the voxel mapping and space-filling curve indexing processes described herein may use an algorithm that uses spherical geometry for detecting circles and circular arcs from complex polygons. The algorithm may include calculations for approximating the center point, radius, curvature angles, start angles, and end angles of potential circles. Identifying calculations and/or formulae for potential circle features may enable the storage of circles and circular arcs in a more spatially efficient format than traditional data storage techniques. For example, circles or spheres may be represented by the center point and radius of the circle or sphere, circular arcs may be represented by the center point, radius, start angle, and end angle of the arc, and so on.

In this way, voxel mapping device 230 can index the second set of voxels in a data storage device using an index, enabling voxel mapping device 230 to make map data available to user devices 210 in a different form than the map data provided by the first set of voxels. While process 400 describes the generation and indexing of two sets of voxels, in some implementations, process 400 can include the generation and indexing of greater than two sets of voxels. For example, multiple sets of voxels can be generated, with different sets being generated for use by different types of user device 210 and/or for storage and different data storage sizes. As indicated above, in some implementations voxel mapping device 230 can make the voxel data available to many different types of user device 210 (e.g., upon request by or on behalf of user device 210).

In some implementations, voxel mapping device 230 can update one or more voxels. For example, voxel mapping device 230 can receive map data from map data provider 220, and the map data might include an update to previously provided map data. In this situation, voxel mapping device 230 can update the index by updating only the changed portion of the map data, obviating the need to re-index map data, a voxel, or an entire set of voxels. By way of example, a set of voxels used for aircraft navigation might include weather conditions associated with a particular voxel, government airspace restriction boundaries, and timestamps associated with the last time weather conditions and government airspace restriction boundaries were updated. An aircraft passing through one of the example voxels described above might use weather observation instruments to obtain data regarding the weather conditions and provide the data to voxel mapping device 230 as updated map data. Based on the updated map data, voxel mapping device 230 can update the weather conditions (e.g., if the weather conditions changed) and/or the corresponding timestamp (e.g., whether changed or not) for the weather conditions while leaving the voxel data regarding government airspace restrictions, and its timestamp, unchanged. Updating indices in the manner described above can be performed in a manner designed to be more efficient than re-indexing all voxel data or large portions of voxel data that haven't changed.

Voxel data that is generated and indexed by voxel mapping device 230 can be used by a variety of user devices 210. By way of example, a UAV that is used to deliver a package might obtain voxel data from an index created by voxel mapping device 230. In this situation, before and/or during flight, the UAV might query the index for voxels that correspond to the coordinates along its flight path (e.g., using network communications to query a server computer with access to the index). The UAV can use the voxel data, for example, to plan and execute its flight path, using voxel data regarding weather, air traffic, building information, terrain information, no-fly zone restrictions, and/or the like to navigate safely and perform package delivery. UAVs are often not equipped with high power computers, significant storage resources, and/or high bandwidth communications devices. Additionally, UAVs may not have continuous network connectivity or high bandwidth available, in some situations. Accordingly, the ability for the UAV to obtain voxel data that uses relatively low processing power to process, relatively few storage resources to store, and/or relatively low bandwidth to communicate, can greatly influence the safety and efficiency of UAV operations.

In addition, in some implementations the UAV might be able to provide map data to voxel mapping device 230, enabling voxel mapping device 230 to keep the indices up to date. For example, during a UAV flight, the UAV might record updated weather conditions and transmit the weather conditions to voxel mapping device, along with the coordinates of the UAV, enabling voxel mapping device 230 to update a timestamp associated with the weather conditions of the voxel that corresponds to the UAV coordinates and, if the weather conditions change, to update the indexed weather conditions accordingly.

Although FIG. 4 shows example blocks of process 400, in some implementations, process 400 can include additional blocks, fewer blocks, different blocks, or differently arranged blocks than those depicted in FIG. 4. For example, the receipt of map data (e.g., block 410), may occur before or after the generation and indexing of either set of voxels (e.g., blocks 420, 430, 440, and/or 450). Additionally, or alternatively, two or more of the blocks of process 400 can be performed in parallel.

Figure 5:
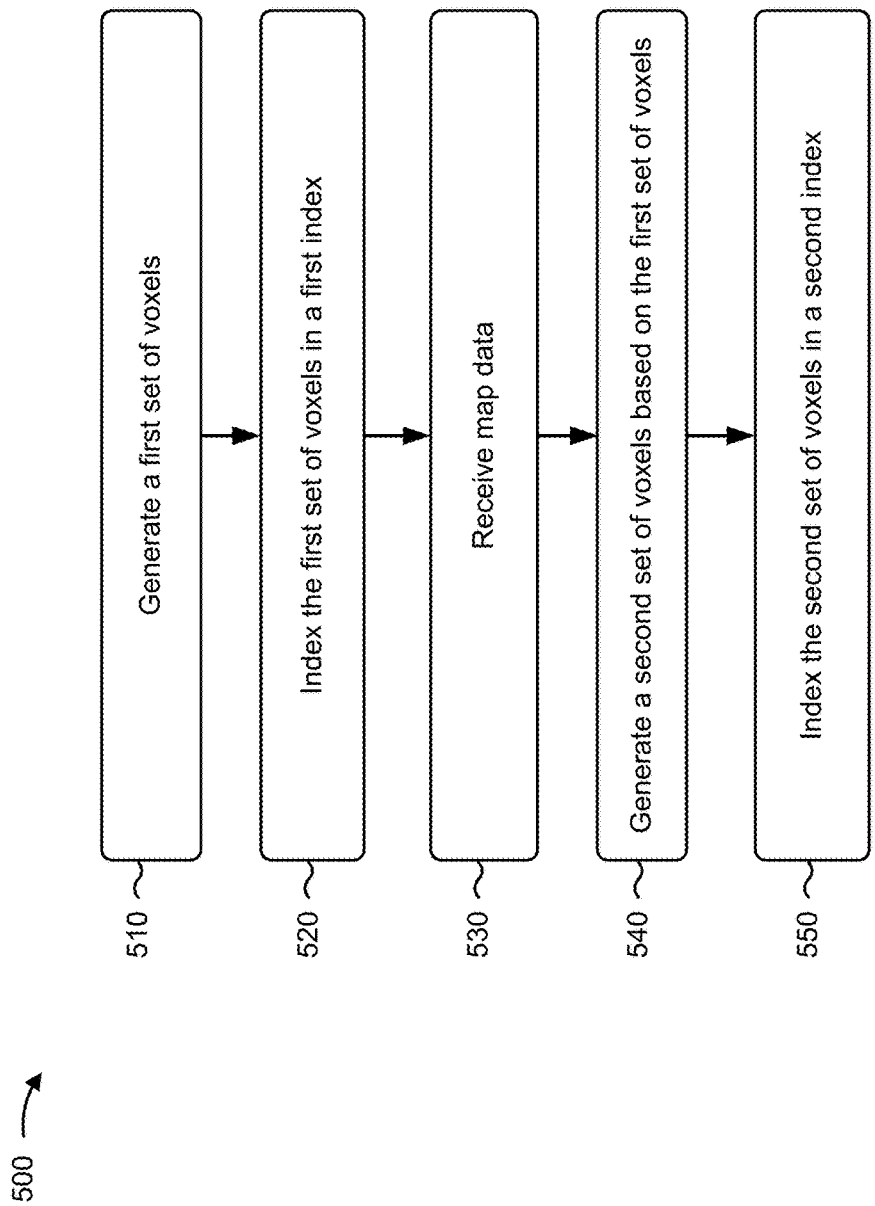
FIG. 5 is a flow chart of another example process for three-dimensional voxel mapping.

FIG. 5 is a flow chart of another example process 500 for three-dimensional voxel mapping. In some implementations, one or more process blocks of FIG. 5 can be performed by voxel mapping device 230. In some implementations, one or more process blocks of FIG. 5 can be performed by another device or a group of devices separate from or including voxel mapping device 230, such as user device 210, map data provider 220, and/or pattern analyzer device 240.

As shown in FIG. 5, process 500 can include generating a first set of voxels (block 510). For example, voxel mapping device 230 may generate a first set of voxels in a manner the same as or similar to that described above with reference to block 420. In example process 500, the generation of the first set of voxels can be performed without reference or receipt of map data, e.g., using empty voxels of a shape, size, and arrangement that is based on a predetermined configuration, user input, and/or the like.

As further shown in FIG. 5, process 500 can include indexing the first set of voxels in a first index (block 520). For example, voxel mapping device 230 may index the first set of voxels in the first index in a manner the same as or similar to that described above with reference to block 430. The indexing of the first set of voxels can be based on the first set of voxels, as well as a predetermined configuration, user input, and/or the like. Generating and indexing empty voxels can enable voxel mapping device 230 to prepare for receipt of map data, e.g., enabling voxel mapping device 230 to use the index when populating voxels with map data.

As further shown in FIG. 5, process 500 can include receiving map data (block 530). For example, voxel mapping device 230 may receive map data in a manner the same as or similar to that described above with reference to block 410. In this situation, voxel mapping device 230 may use the index to store map data in voxels.

As further shown in FIG. 5, process 500 can include generating a second set of voxels based on the first set of voxels (block 540). For example, voxel mapping device 230 may generate a second set of voxels based on the first set of voxels, e.g., in a manner the same as or similar to that described above with reference to block 440, enabling voxel mapping device 230 to store different representations of map data that may be useful to different types of user devices 210.

As further shown in FIG. 5, process 500 can include indexing the second set of voxels in a second index (block 550). For example, voxel mapping device 230 can index the second set of voxels in a second index, e.g., in a manner the same as or similar to that described above with reference to block 450. Indexing the second set of voxels in the second index may further facilitate making map data available to user devices 210.

Although FIG. 5 shows example blocks of process 500, in some implementations, process 500 can include additional blocks, fewer blocks, different blocks, or differently arranged blocks than those depicted in FIG. 5. For example, the generation and indexing of the second set of voxels (e.g., described in blocks 540 and 550), may be performed prior to the received of map data (e.g., described in block 530). Additionally, or alternatively, two or more of the blocks of process 500 can be performed in parallel.

Some implementations, described herein, provide voxel mapping device 230 that is capable of generating and indexing voxels that are based on map data. Voxel mapping device 230 can associate a variety of map data with a voxel, which represents a value in 3D space. Voxel mapping device 230 can generate voxels at a variety of resolutions, or scales, and index the voxels at multiple resolutions. Generating multiple indices with different voxel resolutions can enable a devices to store and/or make use of 3D voxel mapping data at a resolution appropriate to a given context. Using voxel maps at an appropriate resolution can enable devices to conserve resources such as storage, processing, and data transmission resources, which can also affect energy consumption (e.g., battery life). In some implementations, voxel mapping device 230 can identify shapes within a voxel that are capable of being represented by an identifier or other representative data (e.g., an equation or the like). The ability to represent shapes by an identifier, rather than using multiple pieces of map data, can further enable a device that uses voxel mapping data to conserve resources. A reduction in resource usage for devices that make use of map data can increase the efficiency of, and reduce the cost of, using 3D map data in a variety of contexts, and can enable the use of 3D map data by devices that might not have otherwise had the computing resources to do so.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, greater or less than the threshold for a period of time, and/or the like.

To the extent the aforementioned embodiments collect, store, or employ personal information provided by individuals, it should be understood that such information shall be used in accordance with all applicable laws concerning protection of personal information. Additionally, the collection, storage, and use of such information might be subject to consent of the individual to such activity, for example, through well known "opt-in" or "opt-out" processes as might be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive map data from at least one map data provider, the map data including a plurality of data points representing information regarding a space;
generate a first set of voxels based on the map data, the first set of voxels representing a first three-dimensional space that includes:
at least a portion of the space represented by the map data, and
first voxel data corresponding to at least one of the plurality of data points;
index the first set of voxels in a first index;
receive pattern data that specifies a pattern identified in the first voxel data;
generate a second set of voxels based on the first set of voxels,
the second set of voxels representing a second three-dimensional space that is included in the first three-dimensional space,
the second set of voxels including second voxel data,
the second voxel data including a subset of the first voxel data and at least a portion of the pattern, and
where the one or more processors, when generating the second set of voxels based on the first set of voxels, are to:
determine that the pattern spans multiple voxels included in the second set of voxels; and
include, in each of the multiple voxels spanned by the pattern, pattern reference data that identifies a location within the voxel where the pattern intersects an edge of the voxel;
generate a formula representing the portion of the pattern;
replace, in the second voxel data, data representing the portion of the pattern with the formula; and
index the second set of voxels in a second index.

2. The device of claim 1, where each of the plurality of data points includes at least two coordinates that define a location in the space represented by the map data.

3. The device of claim 1, where at least one of the plurality of data points includes a vector that defines a location in the space represented by the map data.

4. The device of claim 1, where the plurality of data points represents, for the space, at least one of:
terrain information;
environment information;
topographical information;
street information;
border information;
space restriction information;
material information; or
object information.

5. The device of claim 1, where the one or more processors, when receiving the map data from the at least one map data provider, are to:
receive, from a first map data provider, a first portion of the plurality of data points representing information regarding the space; and
receive, from a second map data provider, a second portion of the plurality of data points representing information regarding the space,
the second portion being different from the first portion.

6. The device of claim 5, where the one or more processors, when generating the first set of voxels based on the map data, are to:
include, in the first three-dimensional space, at least a portion of:
the first portion of the plurality of data points, and
the second portion of the plurality of data points.

7. The device of claim 5, where:
the one or more processors, when generating the first set of voxels based on the map data, are to:
include, in the first three-dimensional space, at least a portion of the first portion of the plurality of data points; and
the one or more processors, when generating the second set of voxels based on the first set of voxels, are to:
include, in the second three-dimensional space, at least a portion of the second portion of the plurality of data points.

8. A non-transitory computer-readable medium storing instructions, the instructions comprising:
one or more instructions that, when executed by one or more processors, cause the one or more processors to:
receive map data from at least one map data provider,
the map data including a plurality of data points representing information regarding a space;
generate a first set of voxels based on the map data,
the first set of voxels representing a first three-dimensional space that includes:
at least a portion of the space represented by the map data, and
first voxel data corresponding to at least one of the plurality of data points;
index the first set of voxels in a first index;
receive pattern data that specifies a pattern identified in the first voxel data;
generate a second set of voxels based on the first set of voxels,
the second set of voxels representing a second three-dimensional space that is included in the first three-dimensional space,
the second set of voxels including second voxel data,
the second voxel data including a subset of the first voxel data and at least a portion of the pattern, and
where the one or more instructions, that cause the one or more processors to generate the second set of voxels based on the first set of voxels, cause the one or more processors to:
determine that the pattern spans multiple voxels included in the second set of voxels; and
include, in each of the multiple voxels spanned by the pattern, pattern reference data that identifies a location within the voxel where the pattern intersects an edge of the voxel;
generate a formula representing the portion of the pattern;
replace, in the second voxel data, data representing the portion of the pattern with the formula; and
index the second set of voxels in a second index.

9. The non-transitory computer-readable medium of claim 8, where the one or more instructions, that cause the one or more processors to generate the first set of voxels based on the map data, cause the one or more processors to:
identify, based on a density of the map data, a subset of the map data that will not be represented in the first voxel data.

10. The non-transitory computer-readable medium of claim 8, where the one or more instructions, that cause the one or more processors to generate the second set of voxels based on the first set of voxels, cause the one or more processors to:
identify, based on a density of the first voxel data included in the first set of voxels, a second subset of the first voxel data that will not be represented in the second voxel data.

11. The non-transitory computer-readable medium of claim 8, where:
the first set of voxels are arranged in a regular grid, and
each voxel in the first set of voxels defines a cube-shaped three-dimensional space.

12. The non-transitory computer-readable medium of claim 8, where:
each voxel in the first set of voxels defines an irregular hexahedron-shaped three-dimensional space, and
for each voxel in the first set of voxels, a volume of the space represented by the voxel is based on coordinates associated with the space represented by the voxel.

13. The non-transitory computer-readable medium of claim 8, where the one or more instructions, that cause the one or more processors to generate the second set of voxels based on the first set of voxels, cause the one or more processors to:
subdivide the first set of voxels.

14. A method, comprising:
receiving, by at least one of one or more devices, map data from at least one map data provider,
the map data including a plurality of data points representing information regarding a space;
generating, by at least one of the one or more devices, a first set of voxels based on the map data,
the first set of voxels representing a first three-dimensional space that includes:
at least a portion of the space represented by the map data, and
first voxel data corresponding to at least one of the plurality of data points;
indexing, by at least one of the one or more devices, the first set of voxels in a first index;
receiving, by at least one of the one or more devices, pattern data that specifies a pattern identified in the first voxel data;
generating, by at least one of the one or more devices, a second set of voxels based on the first set of voxels,
the second set of voxels representing a second three-dimensional space that is included in the first three-dimensional space,
the second set of voxels including second voxel data,
the second voxel data including a subset of the first voxel data and at least a portion of the pattern, and
where generating the second set of voxels based on the first set of voxels comprises:
determining that the pattern spans multiple voxels included in the second set of voxels; and
including, in each of the multiple voxels spanned by the pattern, pattern reference data that identifies a location within the voxel where the pattern intersects an edge of the voxel;
generating, by at least one of the one or more devices, a formula representing the portion of the pattern;
replacing, by at least one of the one or more devices and in the second voxel data, data representing the portion of the pattern with the formula; and
indexing, by at least one of the one or more devices, the second set of voxels in a second index.

15. The method of claim 14, where generating the first set of voxels based on the map data comprises:
- determining the first voxel data to include in the first set of voxels based on a first type of user device associated with the first set of voxels.

16. The method of claim 15, where generating the second set of voxels based on the first set of voxels comprises:
- determining the first voxel data to include in the second set of voxels based on a second type of user device associated with the second set of voxels, the second type of user device being different from the first type of user device.

17. The method of claim 14, where generating the second set of voxels based on the first set of voxels comprises:
- determining the first voxel data to include in the second set of voxels based on an amount of storage resources used to store the first voxel data.

18. The method of claim 14, further comprising:
- receiving, from a user device, a request for third voxel data;
- identifying, based on the request, third voxel data included in one of the first index or the second index; and
- providing the user device with the third voxel data.

19. The method of claim 14, wherein the formula specifies at least a portion of a shape.

20. The method of claim 14, wherein generating the second set of voxels based on the first set of voxels further comprises:
- identifying, based on a density of the first voxel data included in the first set of voxels, a second subset of the first voxel data that will not be represented in the second voxel data.

* * * * *